May 10, 1966 R. L. SMIRL 3,249,995
METHOD OF FABRICATING CLUTCH DRIVEN PLATE ASSEMBLY
Original Filed Aug. 11, 1961 2 Sheets-Sheet 2
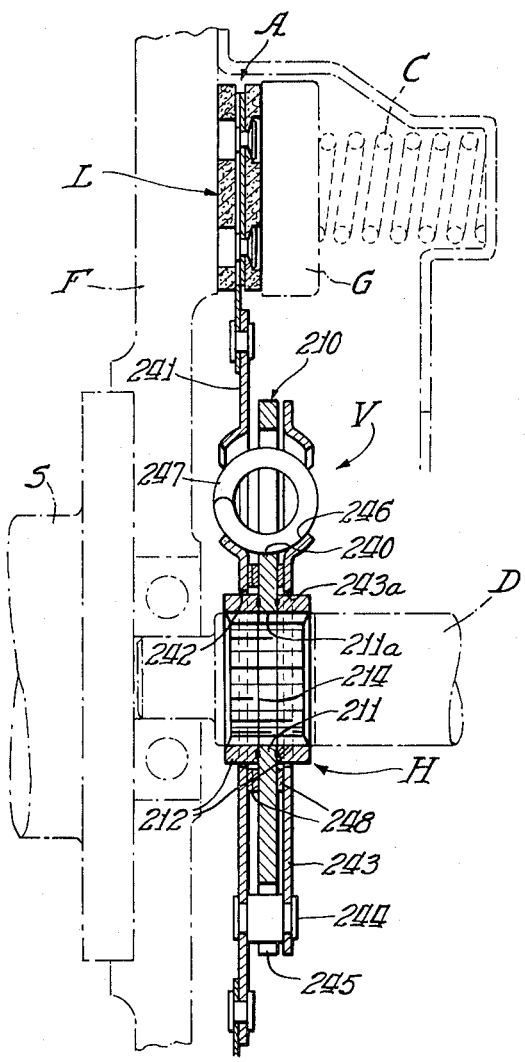
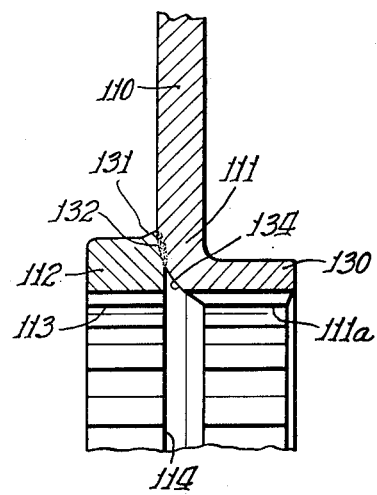
Inventor:
Richard L. Smirl
By: Joseph W. Malleck
Atty.

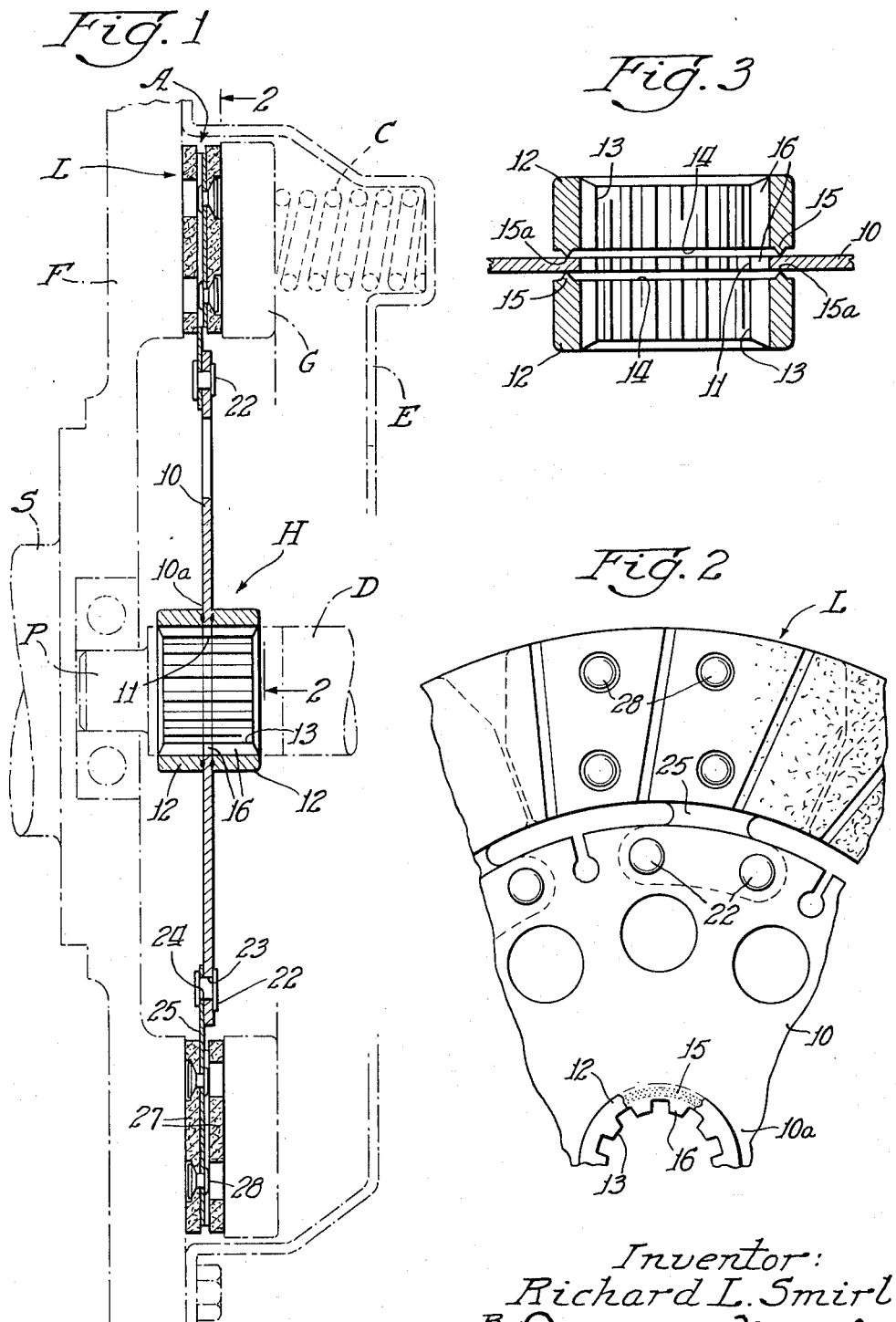

United States Patent Office 3,249,995
Patented May 10, 1966

3,249,995
METHOD OF FABRICATING CLUTCH DRIVEN PLATE ASSEMBLY
Richard L. Smirl, La Grange Park, Ill., assignor to Borg-Warner Corporation, Chicago, Ill., a corporation of Illinois
Original application Aug. 11, 1961, Ser. No. 130,906. Divided and this application Oct. 13, 1964, Ser. No. 409,341
1 Claim. (Cl. 29—486)

This case is a division of copending application 130,906, filed August 11, 1961, titled Clutch Driven Assembly.

This invention relates to clutch mechanisms and more particularly to a method of fabricating a driven plate assembly used in frictional-type clutch mechanisms and to the improved construction resulting therefrom, the method and construction providing an assembly having superior torque transmitting characteristics wherein useful life is substantially increased with increased economy of fabrication.

Heretofore, hub portions of driven plate assemblies for clutch mechanisms have been formed as forgings having a central sleeve with splines for a driving connection to a driven shaft and having an integral flange extending radially outwardly from the sleeve to which was bolted a flat annular hub plate. In some instances, the flange of the forging may have been formed sufficiently large so that the hub plate and sleeve were one piece. However, in each construction the forging method, although satisfactory, has not provided the reduction in assembly time and cost of fabrication apparent from this invention. Each forging would require all-over machining to adapt them for use, which, compared to the present method, is quite exorbitant. Furthermore, stronger materials may now be employed for construction of the hub plate and sleeve than have heretofore been possible by use of forgings.

Pursuant to these improvements, it is contemplated herein that the hub assembly be comprised of a flat circular hub plate having a central portion adapted to extend radially inwardly to drivingly engage the output or driven shaft; the driving engagement is provided by having the opening in the central portion small enough so that its sides may be splined to the output shaft. Fused to marginal portions of the hub plate about the opening are cylindrical sleeve members each having their cylindrical hollow interior in axial alignment with the plate opening. The fusion is accomplished by resistance welding producing a hub unit wherein the sleeve member and hub plate co-operate to distribute torque loads to the output shaft. Splines are formed on the radially inner surface of the hub plate and each sleeve member following the welding step so that the splines may extend continuously through the fusced pieces and be in perfect alignment.

It is a primary object of this invention to provide an improved method of fabrication and resulting construction for a driven plate assembly used in a clutch mechanism. Among the intended advantages provided by the improved method are gains in economy due to a reduction in assemblage time and a cost savings resulting from use of standardized stock material components for constructing various sized driven plate assemblies. Unnecessary all-over machining operations are avoided. Use of simple stock material shapes such as tubes and plate components permit the employment of more ductile, heat treated steels ordinarily prohibited by the forging method.

Another object of this invention is to provide a driven plate assembly for a clutch having a more rugged hub plate cooperating with one or more sleeve members to transmit torque loads to an output shaft whereby failure by localized stress is minimized. More particularly, this construction provides that a failure within the hub will not make the vehicle with which it is used inoperative. The hub plate can transmit torque loads by itself should welding failures occur in the hub assembly.

Still another object of this invention is to provide an improved driven plate assembly for a clutch whereby dampening means may be stationed more closely adjacent the output shaft to provide a more compact assembly.

A still further object of this invention is to provide an improved method of construction of a driven plate assembly for a clutch wherein a circular plate of substantially uniform thickness is formed with a central opening adapted to engage the output shaft of said clutch, forming cylindrical sleeve members and integrally fusing said sleeve members to the circular plate by resistance or projection welding, said welding step comprising the formation of annularly arranged projections along one end of each sleeve and bringing said ends into engagement with the circular plate so that an electric current may be passed between the plate and sleeve members through said projections to produce a fused and highly rigid, durable connection, and providing aligned splines on the radially inner surfaces of the circular plate and sleeve members.

The invention consists of the novel constructions, arrangements and devices to be hereinafter described and claimed for carrying out the above-stated objects and such other objects as will appear from the following description of a preferred form and alternative embodiments of the invention illustrated with reference to the accompanying drawings, wherein:

FIG. 1 is an elevational and central sectional view of a driven plate assembly embodying the features of this invention and illustrated as employed in a typical frictional clutch mechanism indicated in outline;

FIG. 2 is an enlarged fragmentary plan view of the driven plate assembly taken substantially along line 2—2 of FIG. 1 and illustrating in dotted outline the welding arrangement;

FIG. 3 is an enlarged fragmentary view of separated members of the driven plate assembly illustrating one step in the construction of said assembly;

FIG. 4 is an enlarged fragmentary view of a driven plate assembly illustrating another embodiment of the invention; and FIG. 5 is a fragmentary central sectional view of a driven plate assembly illustrating still another embodiment of this invention.

Turning now to the drawings and more particularly to FIGS. 1–3, there is illustrated a method of fabrication and resulting construction according to the present invention.

The drawings are to be understood as being more or less of a diagrammatic character for the purpose of disclosing preferred and alternative forms and the method of making the improved friction clutch driven plate contemplated herein; in these drawings like reference characters identify the same or similar parts in different views.

The frictional clutch mechanism in which the driven plate assembly is employed may be briefly described as comprising generally an engine crank shaft S carrying a rotatable driving member or flywheel F to which a clutch pressure plate G is drivingly connected for axial movement to effect clutch engagement of a driven plate assembly A which is carried by the rotatable driven member or shaft D. The driven shaft D is piloted as at P in the proximate end of driving crankshaft S. The clutch driven plate assembly A has hub members drivingly connected to the driven shaft D. A clutch engaging force is normally applied by biasing means C acting between a coverplate E and the pressure plate G and operative according to conventional construction.

The method of this invention is adapted to provide a driven plate assembly A for such a clutch mechanism which will exhibit superior strength and wearing characteristics than have heretofore been possible under known methods of construction. First, a hub assembly H is provided having a hub plate, generally indicated 10, formed as a single ply circular flat plate of substantially uniform thickness and having a central portion 10a with a central opening 11 (FIG. 3) for receiving the driven shaft D and to be drivingly connected thereto. The circular plate 10 may be made from hardened and ductile steel materials or other type of metal adapted for a projection welding operation to be described hereinafter.

Next, a pair of sleeve members 12 are formed each having a central bore 13 with an internal diameter generally commensurate with the diameter of opening 11 of circular plate 10. At one end 14 of each of the sleeve members (see FIG. 3), an annular ring projection 15 is formed extending axially outwardly from the annular face thereof. The ring projection 15 may be formed with a generally triangular cross-section having the tip 15a thereof as the outermost portion or extremity of the projection.

One sleeve member is then placed on each side of the circular plate 10 in alignment with the opening 11 (FIG. 3). In such position, the ring projection 15 should have its annular tip in engagement with the area of the circular plate marginal to opening 11 so as to place the constituent parts of the hub assembly in position for administering a projection or resistance welding operation.

While pressure is applied in an axial direction to the sleeve members to bring together and to force them toward the circular plate, an electrical current is passed locally through the central portion of the circular plate 10 so that it passes through the ring projection 15 and thence locally through the adjacent sleeve member. Such electrical current may be applied to the plate and sleeve member from any convenient source and by suitable wiring connections (not shown). Upon application of the electrical current, the ring projection is caused to act as a resistance element capable of building up a high internal temperature resulting in a melting thereof. The metal of the circular plate 10 and sleeve member ends 14 surrounding the ring projection are similarly, but to a lesser degree, elevated in temperature by the electrical current so as to cooperate with the projection in providing a film of metal which integrally bonds the sleeve members and plate in an extremely strong manner. Destruction test results have shown such bond to be of such strength that breakage in the driven plate assemblage will occur first by the metal reaching its elastic limit before the weld severs. Upon completion of resistance welding between the sleeve members and the circular plate, the driven plate construction will appear as shown in FIG. 1, wherein the flat annular face of end 14 of each sleeve member abuts the marginal area of the circular plate 10. In this embodiment, the thickness of plate 10 is less than the thickness of the walls of the sleeve members 12.

To adapt the driven plate for transmission of power to an output shaft, the sleeve members and circular plate, being in the rigidly connected condition, are provided with splines 16 on the internal surfaces which define bores 13 and opening 11. The splines extend entirely through the welded unit; splines on individual members of the unit are assured of being in perfect alignment by virtue of forming the splines by a single tooling operation such as broaching.

To complete the driven plate assembly, the hub assembly is provided with a friction facing supporting assembly means L which preferably comprises a plurality of yieldable spring cushion members 25 which extend radially along side the plate 10 and have an inner region fastened to plate 10 by suitable rivets 22 extending through circumferentially spaced and aligned openings 23 and 24 in the plate 10 and cushion members 25 respectively. Axially spaced annular friction facings 27 are anchored to opposite sides of the cushions by rivets 28, whereby said cushions normally space the facings yieldably from each other so that under the pressure which is exerted during clutch engagement said cushions are adapted to collapse against the confronting surfaces of the friction facings.

Such method of construction provides several advantages, among which is the ability of the driven plate assembly to unload torque applied to the friction facing assembly L in a gradual manner to shift such loads to the hub plate 10 when weakening of the weld, although unlikely, occurs between it and the sleeve members. The weld is always prevented from going to a complete separation by virtue of such shifting.

As shown in FIGS. 4 and 5, an alternative embodiment is illustrated, having parts similar to those of the preferred embodiment prefixed by "1," and having a construction in which a central portion 111 of a circular hub plate 110 is formed with an annular axially extending flange 130 protruding from one side thereof. The flange 130 has a central opening 111a adapted to be drivingly connected to a driven shaft (not shown). This embodiment employs only one sleeve member 112 formed with an annular shoulder 131 at end 114 thereof. The shoulder 131 has formed thereon a continuous annular ring 132 with a triangular cross-section similar to the cross-section of ring projection 15 of the preferred embodiment. The outer annular lip of ring 132 is placed in engagement with the annular shoulder 134 of flange 130 when the bore 113 of the sleeve member is aligned with the opening 111a of the flange. This positioning prepares the plate and sleeve member for accomplishing the welding step in accordance with the steps described for the preferred embodiment; the remaining steps are also similar wherein splines are formed in the walls of the bore 113 and opening 111a and the friction facing assembly is applied to the outer region of plate 110.

Still another embodiment is illustrated in FIG. 5 wherein parts similar to those of the preferred embodiment are prefixed by "2"; this construction employs a vibration dampening assembly V between the friction-facing assembly and the hub plate assembly H. The hub plate assembly comprises a metal hub plate 210 formed as a circular flat member of substantially uniform thickness having a central portion 211 with an opening 211a and having a plurality of apertures located preferably radially inwardly from the outer periphery of the plate 210 for receiving elements of the vibration dampener assembly. A sheet metal disc 241 is carried on the hub assembly H and is adapted to support the friction facing assembly at its outer region. The disc 241 has a central opening 242 adapted to be spaced from a sleeve member periphery, to be described. The disc 241 extends radially along side and spaced from the adjacent forward face 211b of the hub plate 210.

An annular sheet metal washer plate 243 is positioned next to the hub plate 210 on the side thereof which is opposite the disc 241. The outside diameter of said washer plate is approximately the same as the outer diameter of said hub plate 210 with which it is associated and has a central opening 243a with a diameter generally commensurate with the diameter of opening 242. Spool rivets 244 tie together the outer region of washer plate 243 and the adjacent region of disc 241 in a manner for conjoint rotation. The enlarged body portions of these rivets 244 pass loosely through notches 245 in the rim of the hub plate 210. All of these notches are greater in circumferential dimensions than the diameter of the bodies of the spool rivets 244, thereby permitting limited rotative movement of said disc and washer plate relative to the hub plate 210.

A circumferentially extending row of openings 246 is made both in the disc and washer plate in registry with the apertures 240 of the hub plate. A pluralitay of coil springs 247 are seated in the apertures and openings 240 and 246 to resiliently and drivingly connect the disc, the hub plate and washer plate in a manner so that these parts are adapted to rotate in unison. Frictional braking means 248 are provided for co-operation with hub plate, disc and washer plate during relative rotative movement between these parts. The braking means may preferably take the form of friction washers or spacers of thin metal.

The effect of the yieldable vibration dampener assembly, including the braking means, is to dampen vibrations and rattle which may occur during reversal of torque or acceleration of driving speed in the operation of the device with which the clutch mechanism is used, while the driven plate assembly is clamped between the pressure means and flywheel of the clutch.

To provide the hub assembly of this embodiment with a driving connection with the driven shaft D, the hub plate 210 has its central portion 211 adapted to engage the shaft D. The walls of central openings 243a and 242 of washer plate 243 and disc 241 respectively are spaced slightly outwardly from cylindrical sleeve members 212, integrally bonded to respectively opposite sides of the hub plate; the bore of each sleeve member is generally aligned with the central opening of the hub plate. Each sleeve member is fused to hub plate 210 at its end 214 in the manner previously described by use of an annular ring to accomplish a resistance weld therebetween.

In the embodiment of FIG. 5, it should be pointed out that the method of construction of this invention enables the dampening means to be spaced more closely to the driven shaft than known constructions, thereby providing a more compact clutch unit commensurate with aims of modern automobile design.

The thickness of the hub plate 210 is generally commensurate with the thickness of the sleeve member walls and is generally greater in thickness than the plate 10 of FIG. 1. In effect, the hub plate 210 is adapted to carry full torque loads, if necessary, through its own splines to the driven shaft and thereby make the driven plate assembly independent of strength of the bond between the sleeve members and hub plate.

It is to be understood that the invention is not to be limited to the specific constructions and arrangements shown and described, except only insofar as the claim may be so limited, as it will be understood to those skilled in the art that changes may be made without departing from the principals of the invention.

I claim:

In a clutch assembly, a method for constructing a driven plate assembly, comprising the following steps: forming a circular flat sheet metal plate of generally uniform thickness with a central opening defined by an inner peripheral wall extending therethrough; forming two straight cylindrical tubes, each having a wall with a uniform thickness and having a central bore extending therethrough of substantially the same diameter as the diameter of said opening, one end of each said tube being formed with a tapered annular projection extending axially outwardly therefrom; placing each said tube adjacent said plate with the bore and opening in general alignment and with the extremity of said projection in engagement with the margin of said plate about said opening; passing an electric current simultaneously between each said tube and plate through said annular projections while applying pressure to said tubes and plate causing them to move axially together, said electric current being sufficient to melt said projections and adjacent plate and tube surfaces to fuse said plate and tubes together; forming splines along the walls of said openings and bore which extends in alignment through both plate and tubes; and providing a friction facing assembly means for connections to the outer regions of said plate.

References Cited by the Examiner

UNITED STATES PATENTS

| | | | |
|---|---|---|---|
| 877,398 | 1/1908 | Brinley | 219—93 XR |
| 904,540 | 11/1908 | Lachman | 219—93 |
| 1,982,235 | 11/1934 | Shepard | 192—107 |
| 2,006,458 | 7/1935 | Jones et al. | 219—93 |
| 2,247,690 | 1/1941 | Nutt. | |
| 2,506,641 | 5/1950 | Hoover | 74—449 |
| 2,870,707 | 1/1959 | Lyon | 29—481 XR |
| 2,932,884 | 4/1960 | Lyon | 29—481 XR |
| 2,968,713 | 4/1961 | Harper | 219—93 |

WHITMORE A. WILTZ, *Primary Examiner.*

JOHN F. CAMPBELL, P. M. COHEN, *Examiners.*